Jan. 7, 1941.  L. C. WEATHERS  2,227,470
ELECTRIC MOTOR
Filed July 21, 1938  4 Sheets-Sheet 1

Inventor
Leland Clay Weathers

By Bacon & Thomas
Attorneys

Jan. 7, 1941.  L. C. WEATHERS  2,227,470
ELECTRIC MOTOR
Filed July 21, 1938  4 Sheets-Sheet 2

Inventor
Leland Clay Weathers
By Bacon & Thomas
Attorneys

Jan. 7, 1941.   L. C. WEATHERS   2,227,470
ELECTRIC MOTOR
Filed July 21, 1938   4 Sheets-Sheet 3

Inventor
Leland Clay Weathers

By Bacon & Thomas
Attorneys

Jan. 7, 1941.  L. C. WEATHERS  2,227,470
ELECTRIC MOTOR
Filed July 21, 1938   4 Sheets-Sheet 4

Inventor
Leland Clay Weathers
By Bacon & Thomas
Attorneys

Patented Jan. 7, 1941

2,227,470

UNITED STATES PATENT OFFICE 2,227,470

ELECTRIC MOTOR

Leland Clay Weathers, Falls Church, Va., assignor to Dawson J. Burns, New York, N. Y.

Application July 21, 1938, Serial No. 220,542

15 Claims. (Cl. 172—239)

This invention relates to electric motor systems, and more particularly to systems in which motors and generators of the synchronous type are rendered stable in operation and are prevented from falling out of synchronism.

An object of the present invention is to provide a motor system and method by which oscillation or hunting of the rotor of a synchronous machine, or rotation of the rotor at other than synchronism with respect to the rotor of a connected machine, is prevented.

Another object of the invention is to provide a motor system and method by which synchronous machines are rendered stable in operation without provision of auxiliary windings or mechanical dampers upon the members of said machines.

Another object of the invention is to provide a method and system of exciting electric motors and generators whereby fields in quadrature with the exciting field are reduced in order to produce stability of operation.

Another object of the present invention is to provide a motor system and method by which oscillation resulting in independent rotation of the receiver of a self-synchronous motor system is prevented without employment of mechanical dampers.

Another object of the invention is to provide a system and method of producing excitation along a quadrature axis in the exciting winding of a synchronous machine in order to insure stability of operation of said machine.

Another object of the invention is to provide a method and system for preventing the production of deleterious fields in quadrature with the exciting field in any of the machines of a self-synchronous motor system.

Another object of the invention is to provide a novel method and system of compensating for angular displacement between the rotors of a receiver and transmitter of a self-synchronous system due to power load on the receiver.

Another object of the invention is to provide a novel receiver in a self-synchronous system requiring a minimum of conductors between the receiver and transmitter.

Another object of the invention is to provide a self-synchronous system and method for which a maximum of three conductors is required between the transmitter and receiver and by which the receiver has a single point of synchronism.

A still further object of the invention is to provide a self-synchronous system and method by which the receiver has a greater torque gradient at zero angle of disagreement than known self-synchronous systems.

Other objects and advantages of the invention will appear in the following description of preferred embodiments of the invention shown in the attached drawings, of which.

As is well known, synchronous machines are generally unstable in operation unless some means is incorporated therein for preventing what is termed "hunting." Such hunting is an angular oscillation of the rotor superimposed upon any rotation thereof and frequently causes direct current excited synchronous machines to fall out of synchronous and the receiver of self-synchronous systems to "spin." The term "self-synchronous" is employed herein to mean systems of the "Selsyn" or "Synchro" type in which alternators or motors are excited with alternating current so as to produce synchronizing torque even at zero rotation of the rotor thereof. In commercial alternators or synchronous motors having direct current excitation, devices for preventing hunting usually take the form of amortisseur windings, although mechanical dampers have been employed, while in self-synchronous systems the receivers are conventionally equipped with mechanical dampers providing for frictional damping of oscillations.

In self-synchronous systems any abruptly applied torque to either a receiver or transmitter causes an angle of disagreement between the rotors of the receiver and transmitter. The alternating current excitation of the system causes a restoring torque to be set up which produces rotation of the receiver rotor to a position corresponding to the position of the transmitter rotor. This rotation causes a single phase induction motor torque to be also set up in the receiver acting in the direction of rotation of its rotor. This single phase induction motor torque along with the inertia of the rotor causes the rotor to be carried past the point of zero angle of disagreement with the transmitter, so that an oscillation is set up about this point. The induction motor action is in phase with oscillation referred to and in the absence of damping devices results in a building up this oscillation until the receiver falls out of step with the transmitter and "spins," that is to say, the rotor rotates in one direction or the other, as a single phase induction motor. The mechanical dampers conventionally employed exert sufficient mechanical friction upon the rotor of the receiver to damp these oscillations. However, the torque due to friction opposes the restoring torque tending to bring the rotor of the receiver to zero angle of disagreement, such that the rotor does not, in general, stop at this zero angle even if no external torque is applied to the receiver. Thus, mechanical dampers are particularly disadvantageous in self-synchronous systems, as the position at the zero angle of disagreement is almost always the desired position. Increasing the size of the transmitter and receiver is not effective, as an increase in size of the machines requires a mechanical damper providing correspondingly increased mechanical friction in order to damp out oscillations. The present invention provides a system by which single phase induction motor torque in receivers of self-synchronous systems is substantially eliminated, rendering mechanical dampers unnecessary.

In self-synchronous systems, the magnitude of the static torque gradient at zero angle of disagreement is extremely important. The present invention not only renders auxiliary damping devices unnecessary but also provides a system in which the torque gradient at zero angle of disagreement is markedly increased over conventional systems.

Figure 1:
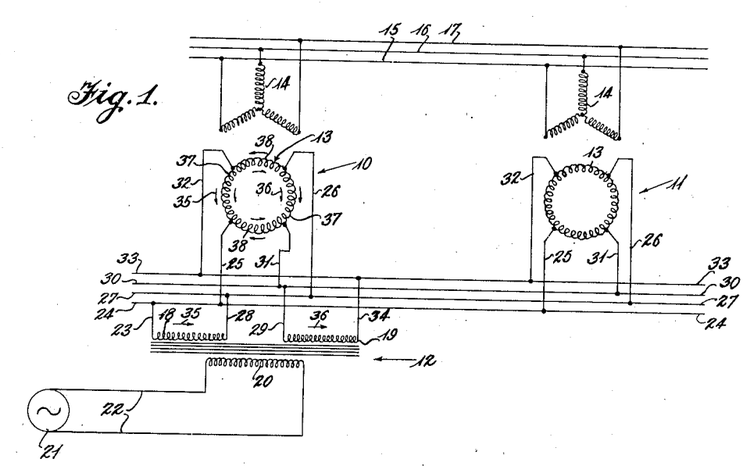
Figure 1 is a schematic diagram of a self-synchronous system illustrating dual excitation of the various machines.

One system in which oscillation and spinning of the receiver is eliminated and the torque gradient at zero angle of disagreement is increased, is shown in Figure 1. In this figure, 10 indicates an improved transmitter, 11 indicates an improved receiver of a self-sylnchronous system and 12 indicates a dual excitation transformer for energizing the exciting winding of both the receiver and transmitter along two axes in quadrature with each other. While one of the machines has been called a receiver and the other a transmitter, for purposes of convenience, it is understood that either machine may be the receiver or transmitter and that a plurality of machines may be connected to each other, any one of which is the transmitter. The same is true of any of the machines denominated either transmitters or receivers in the description of the systems shown in the other drawings hereof, although the machine of a system which is directly excited from a single phase alternating current source of power will ordinarily be employed as the transmitter.

In the embodiment of Figure 1, each machine is provided with an exciting winding 13 which is preferably a closed full pitch distributed winding, although fractional pitch windings may be employed. Each machine is likewise provided with a polyphase secondary winding 14 which is preferably a three phase distributed winding connected in Y as shown, although mesh windings may of course be employed. The secondary windings of the motors 10 and 11 are interconnected by the conductors 15, 16 and 17, as is conventional in self-synchronous systems.

The exciting or primary windings 13 are energized from two electrically separate windings 18 and 19 of the transformer 12 which is provided with a primary winding 20 energized from any suitable source 21 of single phase alternating current power through the conductors 22. The windings 18 and 19 are preferably similar so as to provide the same voltage and have the same impedance. The transformer secondary windings 18 and 19 are each connected across diametrically opposed points of the windings 13 of the machines. For example, winding 18 is connected to the windings 13 through conductors 23, 24 and 25 to one tap of the windings 13 and then from an opposite tap of the winding 13 through the conductors 26, 27 and 28. Winding 19 is connected to the windings 13 through conductors 29, 30 and 31 to a quadrature tap of the winding 13 and then from an opposite tap on the winding 13 through the conductors 32, 33 and 34. It will be noted that the winding 18 of the transformer 12 is connected to the windings 13 in quadrature with the winding 19 of the transformer 12.

Figure 8:
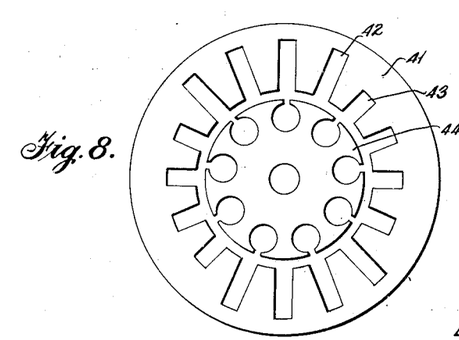
Figure 8 illustrates the employment of slots of different size in the iron member upon which a dual excitation winding is positioned.
Figure 9:
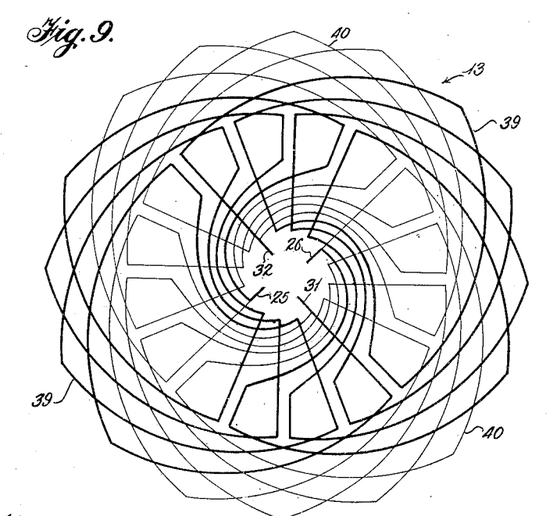
Figure 9 is a schematic wiring diagram, illustrating an example of a dual excitation winding having different size conductors in the various coils.

It will be found that under balanced conditions, current flows in only diametrically opposed quarters of the windings 13 with the connections shown. If at a particular instant the directions of current in the windings 18 and 19 are shown by the arrow 35 and the half arrow 36, respectively, the directions of the currents in the various portions of the winding 13 of machine 10 due to energization from transformer winding 18 are shown by the full arrows, whereas the directions of the current due to energization from winding 19 is shown by the half arrows. It will be noted that these currents add in the portions 37 of the winding 13 and oppose in the sections 38 thereof such that under balanced conditions of equal energization supplied by the transformer windings 18 and 19, no current flows in the portions 38 of the winding 13. Since the currents in transformer windings 18 and 19 are in phase, this condition holds for all portions of the alternating current cycle. The coils comprising portions 38 of the windings 13 can thereby be made of smaller wire than the windings of the coils of the portions 37. Smaller slots can therefore be provided for the coils of portions 38, even though there be the same number of turns in all of the coils. Such a winding is shown diagrammatically in Figure 9, which shows that for a full pitch winding all of the larger coils 39 occupy the same slots and all of the smaller coils 40 occupy the same slots. Thus, as shown in Figure 8, the slots in one member (shown as the stator 41) may be of different sizes to contain the different size coils. Thus slots 42 will contain the coils 39 of larger wire and slots 43 will contain the coils 40 of smaller wire.

The stator 41 of Figure 8 is shown as having a 16-slot construction so as to include sixteen coils, but any desired number of slots and coils may be employed in the stator as long as the number of slots and coils is divisible by four in order to provide for the dual excitation connection shown, for example, in Figure 1. The rotor iron 44 is also indicated in Figure 8 as having a nine-slot construction so as to contain nine coils, but any desired number of slots and coils may be employed so long as they are divisible by three in order to provide for the polyphase connection of the winding 14 also shown in Figure 1. Preferably the number of slots in the rotor iron should be different from that in the stator iron in order to minimize magnetic locking between the teeth of the rotor and stator members. Also the slots on at least one member should be skewed in order to reduce any tendency toward such magnetic locking. A preferred construction is to skew the slots in one member an amount equal to $$\frac{n-1}{n}$$

times the slot width where $n$ is the number of laminations of that member.

The single phase alternating currents flowing in the coils of the portions 37 of the winding 13 produce a single phase oscillating field in the iron of the machines, which field may be assumed to have a vertical axis in the machines 10 and 11 of Figure 1. Any single phase induction motor torque in these machines would be caused by an oscillating field in quadrature to the exciting field due to reaction from currents produced in windings 14 when at least one of the members carrying the windings 14 rotates relative to a member carrying a winding 13. Such a quadrature oscillating field in conjunction with the vertical oscillating field produced by energization of windings 13 would result in a rotating field producing the induction motor action above referred to. The conductors of the coils of the portions 38 of the winding 13 are positioned so as to be cut by this oscillating quadrature field, producing voltages tending to cause currents therein which will set up a magnetomotive force opposing the quadrature field. The transformer windings 18 and 19 provide low impedance return paths for such currents, such that the quadrature field is effectively reduced. Substantially complete elimination of the quadrature field requires that the two circuits including the transformer windings 18 and 19, respectively, have low and the same impedances both as to amount and kind, in order that the currents flowing in the coils of the portions 38 of the windings 13 are not only of sufficient amount but of proper phase to oppose the quadrature field. This requirement may sometimes be departed from quite widely in practice while still causing sufficient reduction of the quadrature field to eliminate hunting or spinning.

Figure 2:
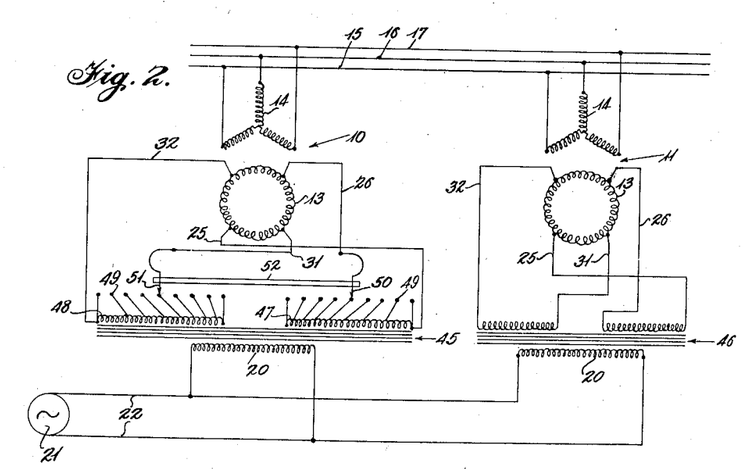
Figure 2 is a view similar to Figure 1, illustrating a system for compensating for the angle of disagreement between the various machines due to torque upon the receiver.

It will be noted that the system of Figure 1 requires seven conductors between the various machines, whereas conventional self-synchronous systems require but five conductors. As shown in Figure 2, the number of conductors between the various machines can be reduced to five, by providing separate dual excitation transformers 45 and 46 for the individual machines 10 and 11.

In Figure 2 is also shown one system of compensating for load torque on the receiver which would tend to produce an angle of disagreement between the receiver and transmitter when the receiver is employed to drive a load. As shown, the secondary windings 47 and 48 of the transformer 45 are provided with a plurality of taps 49. The conductors 26 and 31, instead of being directly connected to the transformer windings 48 and 49, are connected to sliders 50 and 51, respectively, which are movable simultaneously along the taps 49 by means of a member 52. In the position of the taps 50 and 51 shown, the voltages applied to the winding 13 by the transformer secondary windings 47 and 48 are equal and the effect of this energization is exactly the same as the energization of the machines of Figure 1 or the machine 11 of Figure 2. When the member 52 is moved to the right so as to move the sliders 50 and 51 along the taps, a greater voltage is applied between the conductors 31 and 32 than between the conductors 25 and 26. This results in rotating the field set up by the windings 13, such that the rotors of the machines 10 and 11 of Figure 2 will be rotated with respect to each other, that is to say, that the zero position of the rotor of the machine 10 is displaced with respect to that of the rotor of the machine 11. Thus a constant load upon the receiver 11 which would tend to produce an angle of disagreement between the two machines can be compensated for by moving the sliders 50 and 51 so that the angle of disagreement between the rotors is brought to zero under load. By varying the turns between the taps 49 of the windings 47 and 48 as diagrammatically shown, the angle of rotation of the field due to the winding 13 of the machine 10 can be made a straight line function of the movement of the member 52 and also the total energization and thus the resultant saturation of the iron of the machine 10 may be maintained substantially constant.

Figure 3:
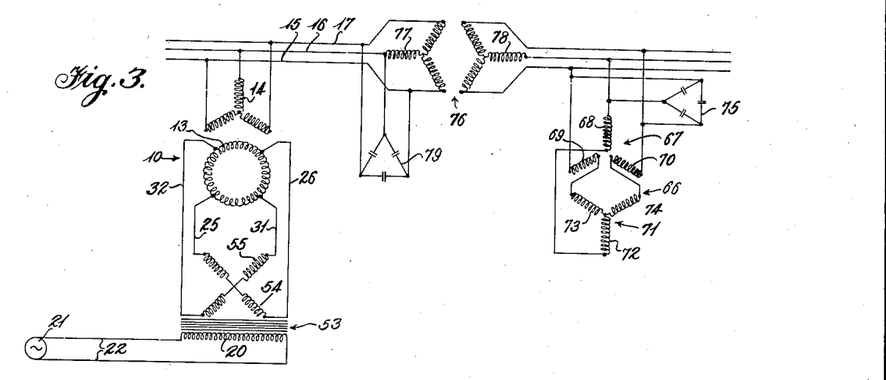
Figure 3 is a schematic diagram showing a modified system for providing compensation and a modified receiver with a differential machine connected between receiver and transmitter.

A different method of compensation is shown as being applied to the machine 10 of Figure 3. The compensating transformer 53 shown in this figure is provided with secondary windings 54 and 55 which may be mounted upon a member rotatable with respect to the member upon which the primary winding 20 is mounted in a manner similar to voltage regulators of the induction type. The windings 54 and 55 are positioned at right angles to each other and are shown in Figure 3 as being positioned at 45° to the primary winding, such that equal voltages are impressed upon the winding 13 of the machine 10 between the conductors 25 and 26 and 31 and 32. By rotating the member carrying the secondary transformer windings 54 and 55, the voltage in one of these windings will be decreased, while the voltage in the other winding is increased and the field set up in the machine 10 by the primary or exciting winding 13 thereof will be rotated, as was the case when the slider 52 of the transformer 45 of Figure 2 was moved. By properly distributing the windings 20, 54 and 55 of the transformer 53, the rotation of the field of the winding 13 may be made proportional to the rotation of the windings 54 and 55 and the resultant excitation of the winding 13 maintained constant, so that the saturation of the iron of the machine 10 is maintained constant.

Figure 4:
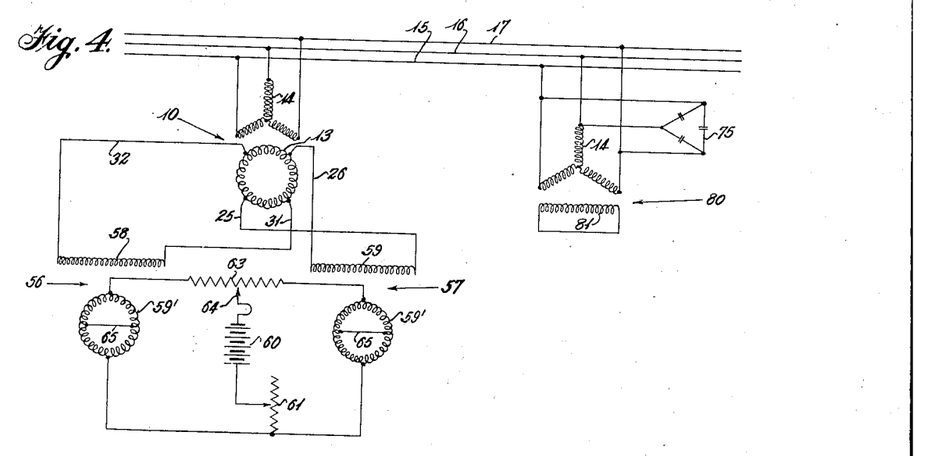
Figure 4 is a view similar to Figure 1, disclosing other modifications of transmitters and receivers.

A still further method of compensation is disclosed in Figure 4. In this embodiment, separate single phase alternators indicated generally at 56 and 57 are employed to provide dual energization of the winding 13 of the machine 10. The secondary or alternating current windings 58 and 59 of the alternators 56 and 57 are connected to the winding 13 in the same manner as the transformer secondary windings 18 and 19 of Figure 1. The field or excitation windings 59' of the alternators 56 and 57 may be energized from a source 60 of direct current. A resistor 61 may be employed to vary the total excitation of the alternators 56 and 57, while a resistor 63 provided with a slider 64 may be employed to vary the excitation of the alternators 56 and 57 with respect to each other. Thus, by moving the slider 64 to the right, the energization of alternator 57 will be increased and the energization of alternator 56 will be decreased such that a greater voltage is applied to the winding 13 between the conductors 25 and 26 than between the conductors 31 and 32. Thus the field due to winding 13 in the machine 10 will be rotated through an angle depending upon the amount the slider 64 is moved. The alternators shown in Figure 4 may be provided with a quadrature connection 65 for purposes which will hereinafter appear. It will be appreciated that the various schemes of compensating for load upon the receiver can be employed with any type of receiver, even the conventional receiver having a winding energized by single phase source of alternating current along a single axis including the mechanical damping above discussed. If substantial compensation is employed with any machine it may be necessary to increase the size of the wire in coils 40 of Figure 9 as exciting current will flow therein, and if compensation as great as 45° in either direction is employed the wire in coils 40 should be the same as that in coils 39.

It was found that, in general, that receiver which includes a single phase alternating current energization from power lines is susceptible of having produced therein deleterious oscillations and spinning even though the transmitter is provided with dual excitation or other means hereinafter discussed for eliminating the single phase induction motor torque in the transmitter. Thus the receivers 11 of Figures 1 and 2 necessitate dual excitation or other electrical or mechanical means of preventing spinning, since they both have a winding 13 energized directly from a source of alternating current power.

A modified type of receiver shown in Figure 3, however, has no winding energized from a single phase alternating current source and will not hunt or spin if the transmitter is provided with some means of preventing single phase induction motor action from arising therein, for example, the devices of Figures 1 to 4. The receiver 66 of Figure 3 may be called a series connected three-wire receiver and has the advantage of requiring no mechanical damping mechanism or electrical connection to prevent hunting and spinning as long as the transmitter is connected so as to prevent a quadrature field from arising therein. The receiver 66 is provided with a winding 67 upon one member including the coils 68, 69 and 70 and a similar winding 71 upon the other member, including the coils 72, 73 and 74. These windings are preferably both distributed windings with the coils 68, 69 and 70 of the winding 67 connected in series with the coils 72, 73 and 74, respectively, of the winding 71. Each of the windings 67 and 71 will set up a field if currents flow therein, each of which fields will cut the conductors of the other winding to produce voltages resulting in power currents causing motor action in a direction to rotate the rotatable member to a position in which the fields line up with each other. Rotation of the rotor of the machine 10 will cause rotation of the fields set up by the windings 67 and 71.

By connecting the windings 67 and 71 so as to cause rotation of the fields due to these windings in opposite directions, rotation of the rotor of the machine 10 through a given angle will cause rotation of the rotor of the machine 66 through twice this angle. Thus a half rotation of machine 10 will cause a complete rotation of machine 66. Thus, for a half rotation of machine 10 there is but a single point of synchronism of the machine 66. Since there is no excitation of the machine 66 from the single phase source of alternating current power, the dual excitation of machine 10 is sufficient to prevent hunting or spinning of the machine 66, as no single phase induction motor torque can be produced in this machine. As the windings of machine 66 are highly inductive, it is preferable to connect a condenser system 75 across the conductors leading thereto in order to furnish exciting current for the machine 66 to improve the power factor of the current taken by the system.

In Figure 3 a differential machine 76 is shown as being positioned between the transmitter 10 and the receiver 66. The differential machine may be of a conventional type shown as having a distributed winding 77 upon one member and a similar distributed winding 78 upon the other member, both preferably Y-connected. A condenser system 79 may also be connected across the conductors leading to the machine 76 in order to supply exciting current thereto. Either the windings 77 or 78 may comprise the rotor winding and rotation of the rotor of this machine through a given angle will shift the rotor of the receiver 66 with respect to the rotor of the transmitter 10 through twice such angle. A differential machine such as 76 may be connected between the transmitters and receivers of Figures 1, 2, 4 and 5 in a similar manner, except that the rotors of the receivers of Figures 1, 2 and 4 will be shifted with respect to the rotor of the transmitters through the same angle as the rotor of the differential machine. Such a differential machine is commonly employed, and is illustrated in Figure 3 merely to show that differential machines may be used in the systems of the present invention.

Such differential machines frequently are employed as a receiver in systems having at least two transmitters. In such cases the differential machines are also subject to hunting or spinning and are conventionally equipped with mechanical dampers. By preventing the production of any substantial quadrature fields in any of the machines of the system which are directly excited from an alternating current source in accordance with the present invention, such hunting or spinning can be eliminated.

The receiver 80 illustrated in Figure 4 is also of the three wire type and includes a winding 14 on one member similar to the windings 14 of Figure 1. The other member is provided with a windng 81 which may be a concentrated or distributed short circuited winding. This winding will assume a position such that any currents produced therein by induction from the winding 14 will set up a field opposing the field produced by the winding 14. Any angle of disagreement between the rotors of the transmitter and receiver will produce power currents giving rise to motor action tending to rotate the rotor of the transmitter or receiver to such zero angle of disagreement. It will be noted, however, that the receiver 80 has two points of synchronism with the transmitter. Substantial elimination of the quadrature field in the transmitter will also prevent hunting or spinning of such a receiver. Since the machine 80 also has no energization from a source of alternating current power, a condenser system 75 may be employed therewith to supply exciting current.

Figure 5:
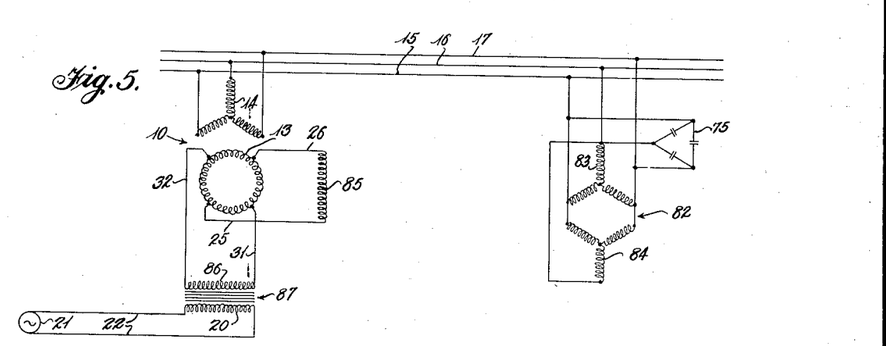
Figure 5 is a view similar to Figure 4, showing a further modified system providing compensation and a further modified type of receiver.

Another modified receiver 82 is disclosed in Figure 5. This receiver is similar to the receiver 66 of Figure 3 except that the windings 83 and 84 thereof are connected in parallel rather than in series, as shown in Figure 3. The operation of the receiver 82 is entirely similar to that of the receiver 66 of Figure 3. For the same voltage operation, the coils of the windings 83 and 84 will have smaller wire and a greater number of turns than the corresponding windings of the receiver 66, since the windings of receiver 82 are connected in parallel and those of the receiver 66 are connected in series. The receiver 82 of Figure 5 may be also provided with a condenser system 75 to provide exciting current.

As stated above, the dual excitation of the machine 10 in Figures 1 to 4, inclusive, provides a path for currents which set up a field opposing the quadrature field resulting in a single phase induction motor action. A theoretical consideration of the connections referred to indicate that the resistance of the quadrature circuits should be as low as practicable and that the impedances thereof should be the same in amount and kind for substantially complete elimination of said quadrature field. The dual excitation systems of Figures 1 to 4 provide systems in which the resistance of these circuits can be made low and also the impedances can be made substantially the same. It is, of course, realized that, when compensation is provided as in Figures 2 and 3, shifting of the taps 50 and 51 of Figure 3 will change the relative impedances of these transformer windings. Thus in Figure 2, movement of the sliders 50 and 51 to the right will increase the impedance of transformer winding 47 both because of a variation in the number of turns and consequent variation in leakage reastance and because of a variation in mutual inductance between the secondary windings and the primary winding. In Figure 3 the mutual inductance between the primary 20 and the secondary windings 54 and 55 will likewise be varied. If the circuit including the primary winding 20 in Figures 2 and 3 has low impedance, this variation of impedance due to variation in mutual inductance will not be material, and will not substantially affect the relative impedances of the dual excitation circuits.

It has been found in practice that the relative impedances of the two dual excitation circuits may vary considerably from the theoretical requirements referred to, in which case the quadrature field will not be entirely eliminated but is reduced to such small value that hunting or spinning of the receiver is not produced.

It has been found that it is not necessary to apply excitation through both circuits; for example, as shown in Figure 5, the conductors 25 and 26 may be connected to an external impedance 85. Such a system has also been found to substantially completely eliminate the quadrature field causing single phase induction motor action if the impedance 85 is substantially equal to the equivalent impedance of the transformer secondary winding 86. Even if the impedance 85 varies somewhat from the equivalent impedance of the winding 86, the quadrature field may frequently be reduced sufficient to prevent hunting and spinning of the receiver. It will be appreciated that the conductors 31 and 32 can be connected directly to the source 21 of alternating current power so that the transformer 87 is unnecessary. In such case the impedance 85 should be the same as the impedance of the source for optimum results. In certain machines in which the equivalent impedance of the circuit including conductors 31 and 32 and the winding 13 of the machine 10 is small, the conductors 25 and 26 may be connected directly to each other and the impedance 85 eliminated. Such a connection will, of course, not eliminate the quadrature field as completely as the systems above discussed, but in some cases will reduce this field to such a small value that hunting and spinning is eliminated.

Figure 10:
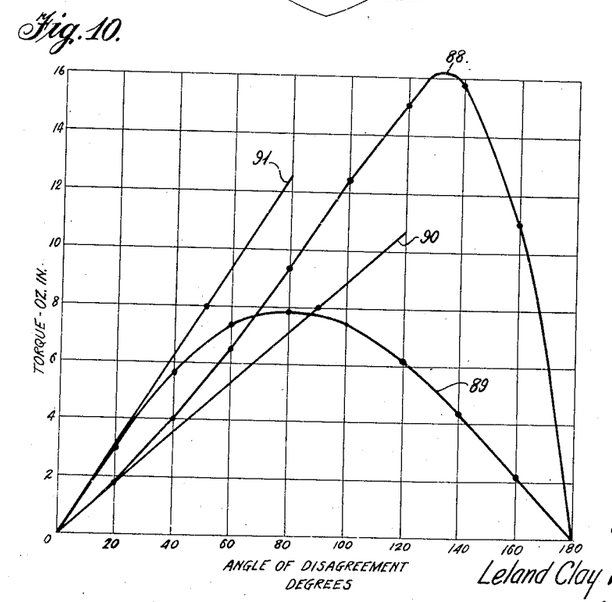
Figure 10 is a graph showing the torque and torque gradient with respect to the angle of disagreement for conventional self-synchronous systems and self-synchronous systems of the present invention.

The dual excitation systems of Figures 1 to 4, inclusive, also markedly improve the torque gradient at zero angle disagreement between the rotors of the various machines. In Figure 10 are shown curves contrasting the static torque characteristics of a system in which a receiver is connected to a conventional transmitter and a system in which dual excitation is employed. For purposes of comparison a conventional transmitter and a transmitter of the type shown at 10 in Figure 1 were successively connected to the receiver 82 of Figure 5. Curve 88 of Figure 10 shows the torque in ounce inches with respect to the angle of disagreement between the rotors of a conventional transmitter and the receiver 82 of Figure 5 and curve 89 shows a similar relationship for the transmitter 10 of Figure 1 and the same receiver. In both cases the exciting winding of the transmitter was upon the stator and no mechanical damping was provided on the receiver. The transmitter was a well designed commercial machine and was converted into a dual excitation transmitter by connecting two additional leads to the appropriate points of the stator winding and connecting the winding to a transformer of the type shown in Figure 1. The voltage applied across the exciting winding of the conventional machine was the rated voltage while the dual excitation voltages were equal to $$\frac{1}{\sqrt{2}}$$

of the rated voltage to provide normal energization of the winding 13, i. e., normal saturation of the iron of the transmitter. The lines 90 and 91 indicate the torque gradients for zero angle of disagreement for the two systems, i. e., the slopes of the curves 88 and 89, respectively, at zero.

It will be noted that the maximum torque as shown by the curve 88 for the conventional transmitter greatly exceeded the maximum torque as shown by the curve 89 when the machine was dually excited. However, it will be noted that the torque gradient at zero angle of disagreement for the dually excited machine and as shown by the line 91 was much greater than the torque gradient of the conventional transmitter shown by the curve 90.

It will further be appreciated that both of the curves 88 and 89 are periodic functions, as these curves would show similar negative loops for a further plotting of torque against the angle of disagreement from 180° to 360° and would then repeat. An analysis of the curves 88 and 89 into Fourier series shows that the curve 88 for a conventional transmitter is a complex trigonometric function involving a large number of harmonics, whereas curve 89 very closely approaches a pure sine function. The function of the curve 88 can be expressed as $T = 12.796 \sin a - 5.905 \sin 2a + 2.156 \sin 3a - 0.814 \sin 4a + 0.267 \sin 5a - 0.055 \sin 6a$, whereas the expression for the curve 89 was found to be $T = 7.174 \sin a + 0.539 \sin 2a$ where T is the torque in ounce inches and $a$ is the angle of disagreement between the rotors of the transmitter and receiver. It will be noted that the curve of 89 contains only a very small component of a second harmonic, the higher harmonics being absent, whereas curve 88 contains large second and third harmonics and appreciably higher harmonics up to the sixth harmonic. Since it is a field in quadrature with the resultant exciting field which causes the torque-angle of disagreement curves to be other than the pure sine function, it will be seen that there is an extremely large quadrature field in a conventional transmitter and that this field is reduced by the dual excitation connection.

The slopes 89 and 91 were obtained by determining the value of the derivatives of the above expressions at zero angle of disagreement; that is, the curves 89 and 91 indicate the slope of the curves 88 and 89, respectively, at zero angle of disagreement. The slope indicated by the curve 89 for the dual excitation machine was found to have a value of .144 ounce inches per degree as contrasted with 0.091 ounce inches per degree for the conventional transmitter. Thus it is seen that the dual excitation connection produces a much greater torque gradient at zero degrees angle of disagreement than the conventional transmitter in addition to the fact that hunting and spinning of the receiver is eliminated. If the equivalent impedances of the dual excitation circuits had been exactly equal and the ratios of the equivalent resistances and reactances in the two machines had also been equal, the torque of the receiver would have been a pure sine function of the angle of disagreement.

The above curves are given merely by way of example and similar curves can be derived for any of the various systems shown in the drawings. For example, if dual excitation were eliminated from both machines of Figure 1, the torque-angle of disagreement curve would be similar to curve 88. If dual excitation were applied to only one of the machines, the torque-angle of disagreement curve would be somewhere between curves 88 and 89. Any difference of impedance between the dual excitataion circuits, for example, by varying the taps 50 and 51 of the transformer 45 of Figure 2, would produce a torque-angle of disagreement characteristic somewhere between curves 88 and 89. The less the difference in impedance between the two circuits, the closer the torque-angle of disagreement curve would approach that of 89.

Also, in the system of Figure 5 equal impedance in the circuits including the impedance 85 and the transformer 86 would produce a torque-angle of disagreement characteristic similar to that of curve 89, whereas different impedances in these two circuits would cause the resultant torque-angle of disagreement characteristic to vary from the curve of 89 and approach that of curve 88 as the difference of impedance became greater. If the impedance of the circuit including the transformer winding 86 is small, the conductors 25 and 26 may be connected directly together without causing the torque-angle of disagreement characteristics to vary greatly from that of curve 89.

The general principle of dual excitation for the prevention of hunting or spinning in the self-synchronous systems of Figures 1 to 5 can also be applied to synchronous machines having direct current excitation, for example, conventional synchronous motors or alternators. The angular oscillation producing hunting in such machines is likewise caused by an oscillating field in quadrature to the main excitation field which can be suppressed in accordance with the present invention.

Figure 6:
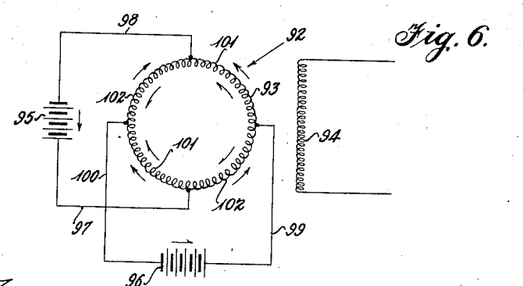
Figure 6 is a diagrammatic view, illustrating the application of dual excitation to a single phase alternator or synchronous motor.

In Figure 6 is diagrammatically shown a single phase synchronous motor or alternator 92 having an exciting winding 93 and a single phase alternating current winding 94. Both windings 93 and 94 are preferably distributed windings of any desired type and are positioned upon the relatively rotatable members of the motor or alternator. The winding 93 may be energized from suitable electrically distinct sources of direct current shown as batteries 95 and 96. The battery 95 is connected through conductors 97 and 98 to diametrically opposite points on the winding 93 and the battery 96 is connected through conductors 99 and 100 to diametrically opposite points on the winding 93 which are in quadrature to the points to which the conductors 97 and 98 are connected. As shown by the arrows and half arrows, this method of excitation causes the currents from the batteries 95 and 96 to add in the portions 101 of the winding 93 and to subtract in the portions 102 of the winding 93. Thus the coils forming the portion of the windings 102 may be made of smaller wire than the coils forming the portions 101. All of the coils, however, preferably have the same number of turns so that the coils forming the coils 102 are of smaller cross-section than the coils forming coil 101. As described relative to the self-synchronous machines of Figure 1, the depth of the slots containing the coils of the portions 101 of the winding 93 may be greater, as shown in Figure 8 previously described.

It has been found that if the impedance of the dual excitation circuits, including the batteries 95 and 96 are of the same order, any tendency of the synchronous machine to hunt is entirely eliminated. Furthermore, any quadrature field set up in the iron of the machine due to reaction from winding 94 is also substantially eliminated, such that the machine of Figure 6, with properly distributed windings, will generate substantially a pure sine wave of voltage and will take a substantially pure sine wave of current when operated as a motor. Any difference in impedance between the dual excitation circuits will cause variation from the ideal sine wave operation, and elimination of one of the dual excitation circuits will, of course, produce the characteristics of the conventional single phase alternator or motor which, in general, produce alternating current voltages having substantial harmonics when operated as a generator and take alternating currents containing substantial harmonics when operated as a motor.

Figure 7:
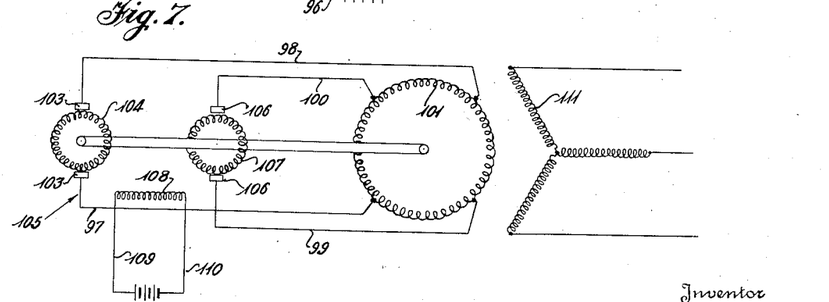
Figure 7 is similar to Figure 6, illustrating the application of dual excitation to a polyphase synchronous motor or alternator.

In Figure 7 a polyphase synchronous motor or generator is shown diagrammatically and is arranged for dual excitation by the employment of two separate exciter circuits. In this modification the exciting winding 101 is connected at diametrically opposite points by conductors 97 and 98 to the commutating brushes 103 of a winding 104 of an exciter 105. The winding 101 is likewise connected at opposite points disposed in quadrature to the points of connection of conductors 97 and 98 by means of the conductors 99 and 100 to the commutating brushes 106 of a separate winding 107 of the exciter 105. Both of the windings 104 and 107 may be placed upon the same rotor of the exciter 105 but are electrically distinct and are each provided with commutating brushes. These windings may cut a single field provided by the field winding 108 connected to a suitable source of direct current through conductors 109 and 110. Although the windings 104 and 107 have been shown as being part of a single exciter structure, it is obvious that separate exciting machines may be employed as well as any other suitable electrically distinct source of direct current, as for example, batteries similar to those shown at 95 and 96 in Figure 6. As in Figure 6, the coils of the winding 101 may have different size wire in different portions thereof.

The alternating current winding 111 is shown as being a polyphase Y-connected winding but may be any suitable type of polyphase winding. Well designed polyphase machines do not, in general, generate voltages having appreciable harmonics therein when operating as a generator, neither do they take current having substantial harmonics when operating as a motor. However, such machines do have the problem of hunting and amortisseur windings or mechanical dampers have been employed to damp out the oscillations which are frequently sufficient to cause the machines to fall out of step. The dual excitation system disclosed in Figure 7 eliminates any tendency to hunt in such machines. The impedances of the dual excitation circuits may in many cases vary considerably from the same values and still provide enough damping action to prevent hunting in either single phase or polyphase alternating current synchronous machines.

As in the case of self-synchronous machines, it is not entirely necessary to apply excitation through both exciting circuits as connecting one of the circuits through an external impedance substantially equal to the impedance of the exciter circuit will produce the same result as explained with respect to the self-synchronous system of Figure 5. In fact, if impedance of the external exciter system is small, the conductors to opposite points of the exciting winding 101 may be connected together to eliminate the external impedance and still produce satisfactory results. Such a connection is shown in Figure 4, in which quadrature short circuit connections 65 are shown in single phase alternators 56 and 57. Such short circuit connections are not as effective as the dual excitation systems but in certain cases have been found sufficiently effective even for employment in machines used for dual excitation of self-synchronous machines as shown in Figure 4, wherein stability of the exciting alternators is an important factor.

In the above description of the invention, no distinction has been made between the stator and rotor windings. It is understood that either of the two windings of any of the various machines can be placed upon either the stator or rotor and that suitable brushes and slip rings will be provided for external electrical connections to the rotor windings. Also, two pole machines have been shown throughout but the present invention is applicable to machines having any desired number of poles.

It will be seen that the present invention provides a system for preventing hunting in synchronous alternating current machines and preventing the production of harmonics in single phase machines. At the same time the present invention provides systems wherein the torque gradient at zero angle of disagreement in self-synchronous systems is markedly increased over conventional systems.

By the term "exciting current of the same phase and frequency" as employed in the claims, I mean to embrace not only alternating current of the same phase and frequency but also direct current, unless the claim is otherwise limited to alternating exciting current, the direct current being considered as the special case of alternating current having zero frequency, as is conventional in electrical theory.

While I have disclosed the preferred embodiments of my invention, it is understood that the invention is not limited to the details disclosed but may be varied within the scope of the following claims.

What I claim is:

1. In a system for stabilizing the operation of synchronous machines, a synchronous machine having relatively rotatable members, a closed exciting winding upon one of said members and a second winding upon the other of said members, a circuit connecting said second winding providing for the flow of alternating currents through said second winding, two sources of exciting current of the same phase and frequency, one of said sources of exciting current being connected across said exciting winding and the other of said sources of exciting current being connected across said exciting winding in quadrature with said first source of exciting current, the total impedance of the circuit including said one source of exciting current being substantially equal to the total impedance of the circuit including said other source of exciting current.

2. In a system for stabilizing the operation of synchronous machines, a synchronous machine having relatively rotatable members, a closed field winding upon one of said members and a second winding upon the other of said members, an external circuit connected to said second winding providing for the flow of alternating currents in said second winding, a source of exciting current connected across said field winding to provide a main field in said machine, a stabilizing circuit including conductors connected to said field winding in electrical quadrature with said source of exciting current to provide a path for currents produced in said field winding by a varying field in quadrature with said main field, said stabilizing circuit including an external impedance in series therewith of substantially the same impedance as the impedance of said source of exciting current.

3. A system for preventing hunting or spinning of synchronous machines in self-synchronous systems, which comprises a series of interconnected synchronous machines having relatively rotatable members with windings upon the opposite members of each machine, a source of alternating exciting current, one winding of at least some of said machines being a closed winding and constituting a field winding energized by said source of alternating current to produce a main oscillating field in some of said machines, a stabilizing circuit for at least some of said machines having a field winding excited from said source of alternating current, said stabilizing circuit having an external impedance therein substantially equal to the impedance of said source of exciting current and being connected across said field winding substantially in quadrature with said source of exciting current so as to provide a path for currents produced in said field winding by an oscillating field in quadrature with said main field.

4. A system for preventing hunting or spinning of synchronous machines in self-synchronous systems, which comprises, a source of alternating exciting current, a plurality of interconnected synchronous machines having relatively rotatable members with windings upon the opposite members of each machine, one winding of at least one of said machines constituting a field winding connected across said source of alternating current to provide a main alternating current field in said machine, said field winding being a closed distributing winding, and a stabilizing circuit for said system including an external impedance in series therewith of substantially the same impedance as said source of alternating current connected across said field winding substantially in quadrature with said source of alternating current power so as to provide a path for currents produced in said field winding by an oscillating field in quadrature with said main field.

5. A system for preventing hunting or spinning in synchronous machines in self-synchronous systems, which comprises a plurality of interconnected synchronous machines having relatively rotatable members with windings upon the opposite members of each machine, the winding on one member of each machine being interconnected with a similar winding of another machine to provide for the flow of synchronizing currents between said machines, a source of alternating exciting current, the winding upon the other member of each of said machines constituting a field winding energized by said source of alternating current to produce a main oscillating field in each of said machines, a stabilizing circuit for each of said machines, said stabilizing circuit being connected across the corresponding field winding substantially in quadrature with said source of exciting current so as to provide a path for currents produced in said corresponding field winding by an oscillating field in quadrature with said machine field, each of said stabilizing circuits including in series therewith a second source of alternating exciting current of the same phase and frequency as said first source.

6. In a self-synchronous system the combination of a plurality of synchronous machines each having relatively rotatable members with a field winding upon one of said members and a second winding upon the other of said members, the second winding of all of said machines being interconnected, a transformer having two independent secondary windings for each of said machines, the secondary windings of each of said transformers being connected substantially in quadrature to the field winding of the corresponding machine and a source of alternating current, each of said transformers having a primary winding energized from said source of alternating current.

7. In a system for stabilizing the operation of synchronous machines having relatively rotatable members with an exciting winding upon one of said members and a second winding upon the other of said members, the combination with a power circuit connected to said second winding providing for the flow of alternating current through said second winding, an exciting circuit including a source of exciting current in series therewith connected across an exciting winding and an impedance circuit including an impedance in series therewith connected across an exciting winding substantially in quadrature with said exciting circuit, the total impedance of said impedance circuit being substantially equal to the total impedance of said exciting circuit.

8. In a system for stabilizing the operation of synchronous machines having relatively rotatable members with an exciting winding upon one of said members and a second winding upon the other of said members, the combination with a circuit connected to said second winding providing for the flow of alternating current through said second winding, a first exciting circuit including a first source of exciting current connected across an exciting winding to supply exciting current to said winding, a second exciting circuit electrically separate from said first exciting circuit and, including a second source of exciting current of the same phase and frequency as said first source, connected across an exciting winding substantially in quadrature with said first exciting circuit, the total impedance of said first exciting circuit being substantially equal to the total impedance of said second exciting circuit.

9. A system as defined in claim 8 in which said first and second sources of exciting current comprise separate secondaries of the same transformer.

10. In a self-synchronous system including a plurality of machines each having relatively rotatable members, a phase wound winding upon at least one member of each machine having its phases connected with corresponding phases of similar windings of the other of said machines to provide for the flow of synchronizing currents between said machines and through said phase wound windings in order to provide synchronizing fields in said machines, a source of alternating exciting current, at least one of said machines being an excited machine having exciting windings upon the other member connected to said source of alternating exciting current, said source comprising a transformer having two electrically independent secondary windings, said secondary windings being connected to said exciting windings at points in electrical quadrature with each other, said other member of any unexcited machine having means acting with the synchronizing field of said unexcited machine to provide a torque tending to maintain corresponding angles between the relatively rotatable members of said machines.

11. In a system for stabilizing the operation of machines of self-synchronous systems, a plurality of synchronous machines having relatively rotatable members, a phase wound winding upon at least one of said members of each machine having its phases connected with corresponding phases of similar windings of the other machines in said system to provide for the flow of synchronizing currents between said machines and through said phase wound windings in order to provide synchronizing fields in said machines, at least one of said machines being an excited machine having exciting windings upon the other of said members thereof, a first source of alternating current connected to said exciting windings and a second source of alternating exciting current of the same phase and frequency as said first source connected to said exciting winding in substantial quadrature with said first source of exciting current, said other member of any unexcited machine having means acting with the synchronizing field of said unexcited machine to provide a torque tending to maintain corresponding angles between the relatively rotatable members of said machines.

12. In a system for stabilizing the operation of machines of self-synchronous systems, a plurality of synchronous machines having relatively rotatable members, a phase wound winding upon at least one of said members of each machine having its phases connected with corresponding phases of similar windings of the other machines in said system to provide for the flow of synchronizing currents between said machines and through said phase wound windings in order to provide synchronizing fields in said machines, at least one of said machines being an excited machine having a closed exciting winding upon the other of said members thereof, a first source of alternating exciting current connected to said exciting winding, and a second source of alternating exciting current of the same phase and frequency as said first source connected to said exciting winding in substantial quadrature with said first source of exciting current, said sources constituting electrically independent transformer windings linked with a common alternating magnetic flux, said other member of any unexcited machine having means acting with the synchronizing field of said unexcited machine to provide a torque tending to maintain corresponding angles between the relatively rotatable members of said machines.

13. In a system for stabilizing the operation of machines of self-synchronous systems, a plurality of synchronous machines having relatively rotatable members, a phase wound winding upon at least one of said members of each machine having its phases connected with corresponding phases of similar windings of the other machines in said system to provide for the flow of synchronizing currents between said machines and through said phase wound windings in order to provide synchronizing fields in said machines, at least one of said machines being an excited machine having exciting windings upon the other of said members thereof, a source of alternating exciting current connected across said field windings to provide a main field, a stabilizing circuit including a conducting path between points on said field windings substantially in electrical quadrature with the points of connection of said source of exciting current to said field windings to provide a path for currents produced in said field windings by any varying field in quadrature with said main field, said stabilizing circuit including a second source of alternating exciting current electrically separate from said first source and of the same phase and frequency as said first source, said other member of any unexcited machine having means acting with the synchronizing field of said unexcited machine to provide a torque tending to maintain corresponding angles between the relatively rotatable members of said machines.

14. In a system for stabilizing the operation of machines of self-synchronous systems, a plurality of synchronous machines having relatively rotatable members, a phase wound winding upon at least one of said members of each machine having its phases connected with corresponding phases of similar windings of the other machines in said system to provide for the flow of synchronizing currents between said machines and through said phase wound windings in order to provide synchronizing fields in said machines, at least one of said machines being an excited machine having exciting windings upon the other of said members thereof, a source of alternating exciting current connected across said field windings to provide a main field, a stabilizing circuit including conductors connected to said field windings in substantially electrical quadrature with said source of exciting current to provide a path for currents produced in said field windings by varying fields in quadrature with said main field, said stabilizing circuit including an external impedance in series therewith having substantially the same impedance as the impedance of said source of exciting current, said other member of any unexcited machine having means acting with the synchronizing field of said unexcited machine to provide a torque tending to maintain corresponding angles between the relatively rotatable members of said machines.

15. In a system for stabilizing the operation of machines of self-synchronous systems, a plurality of synchronous machines having relatively rotatable members, a phase wound winding upon at least one of said members of each machine having its phases connected with corresponding phases of similar windings of the other machines in said system to provide for the flow of synchronizing currents between said machines and through said phase wound windings in order to provide synchronizing fields in said machines, at least one of said machines being an excited machine having exciting windings upon the other of said members thereof, two sources of single phase alternating exciting current connected to said field windings substantially in quadrature, said sources providing exciting current of the same phase and frequency, said other member of any unexcited machine having means acting with the synchronizing field of said unexcited machine to provide a torque tending to maintain corresponding angles between the relatively rotatable members of said machines.

LELAND CLAY WEATHERS.

CERTIFICATE OF CORRECTION.

Patent No. 2,227,470.                                           January 7, 1941.

LELAND CLAY WEATHERS.

It is hereby certified that error appears in the printed specification of the above numbered patent requiring correction as follows: Page 1, second column, line 49, for "synchronous" read --synchronism--; page 2, first column, line 66, for "self-sylnchronous" read --self-synchronous--; page 5, first column, line 51, for "reastance" read --reactance--; page 8, first column, line 33, claim 5, for "in synchronous machines in" read --of synchronous machines of--; and second column, line 51, claim 10, before "connected" insert --thereof--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.